Patented Jan. 28, 1936

2,029,264

UNITED STATES PATENT OFFICE 2,029,264

MANUFACTURE OF CALCIUM ARSENATE INSECTICIDES

Simon Klosky, Roselle, N. J., assignor to The American Agricultural Chemical Company, Newark, N. J., a corporation of Delaware No Drawing. Application March 22, 1933, Serial No. 662,093

12 Claims. (Cl. 167—15)

This invention relates to the manufacture of calcium arsenate insecticides, and particularly calcium arsenate products, for insecticidal and other uses, such for example as those composed essentially of tri-calcium arsenate and/or one or more basic calcium arsenates, or one or more calcium arsenates together with an excess of lime; such substances may generally be prepared by the reaction of arsenic acid and milk of lime. It is well known that in insecticides of the character stated the content of water-soluble arsenic ($As_2O_5$) bust be low, in order to avoid burning of the plants to which the material is applied, and it is likewise known that in the presence of carbonic acid, or carbon dioxide, and moisture, the content of soluble arsenic increases by reason of the reaction with the $CO_2$ and consequent liberation of $As_2O_5$. Hence when the arsenate is dusted on plants the resulting thin film affords an ideal condition for reaction with the carbon dioxide of the atmosphere.

Important objects of the present invention accordingly include the provision of materials of the class described which are highly resistant to carbon dioxide, and which not only may have the low content of water-soluble arsenic desired for an insecticide, but are adapted to withstand deteriorating influences of the atmosphere, thus enabling the arsenate to be used freely without danger of injury to the plants by the burning incident to increase of the soluble oxide $As_2O_5$; and the objects further include the provision of procedure for making calcium arsenate insecticides having these characteristics, and thus for efficiently rendering calcium arsenates, such as described, resistant to carbon dioxide, and able to withstand atmospheric and like deteriorating influences. To these ends it has now been found, for example, that if the calcium arsenate constituent has intimately incorporated with it a small amount of combined fluorine, the insecticide is rendered markedly stable, so that prolonged exposure to atmospheric carbon dioxide, even in damp weather, has no material effect. Thus in one case, a calcium arsenate insecticide containing only 1 per cent of fluorine increased its soluble arsenic (soluble $As_2O_5$) content from an initial value of 0.08 per cent to no more than 0.10 per cent in 114 hours exposure to pure moist $CO_2$, whereas the same material free from fluorine, under the same conditions, increased its soluble arsenic to 2.5 per cent. With numerous other batches of the new insecticide having a like character and containing fluorine, equally good or better results have been obtained, there being in many cases little or no perceptible increase in soluble arsenic content on long-continued exposure to pure moist $CO_2$.

Resistance to carbon dioxide, as just described, can be efficiently obtained in a calcium arsenate product including combined fluorine, the arsenate and fluorine ingredients preferably having a characteristic intimate association or relationship. As is hereinafter brought out in specifically describing certain convenient procedure for producing the stabilized arsenate, notably good results are had when completion of the product involves preferably a chemical reaction or at least a definite physical change or activity involving one or more of the ingredients, taking place simultaneously with or subsequent to the introduction of a fluorine compound, and thereby bringing about the stated intimate association of the final arsenate and fluorine ingredients. Various fluorides or fluorine-containing substances may be introduced in that manner, and the product will accordingly be stabilized for safe insecticidal use on plants; as stated, such stabilized products may particularly include tri-calcium arsenate, basic calcium arsenate, tri-calcium arsenate having an excess of lime, or other like active insecticidal calcium arsenate materials having a low soluble arsenic content.

It is believed that in this form of the invention there is preferably no direct chemical combination of fluorine and arsenate into a single compound, especially so far as the production of such compound might impair the insecticidal activity of the arsenate, as by dilution of its arsenic potency or otherwise. The desired results have been attained where the fluoride and arsenate, for example, are intimately associated as explained, and according to present theory or understanding of the product, such association is of the nature of a mutual adsorption of fluoride and arsenate particles. Investigation of certain batches of the new product reveals, for instance, that the relation of component particles should preferably be more nearly that of a fine dispersion than a relatively coarse indiscriminate mixture, the component particles having an apparent tendency to coat each other, or to intermix with considerable cohesiveness. The complete product thus apparently contains a dispersed system of arsenate and fluoride particles, and although such structure may not be thoroughly understood at present, it is thought that the term "mutual adsorption" will in the light of the above explanation serve to define the relation described. It may also be noted that among other methods, the desired association of ingredients and resulting stabilization are brought about especially well, and an excellent insecticidal powder or the like obtained, when completion of the product involves its production in the form of a precipitate in the water in which the procedure is carried out.

The stabilizing effect can be obtained with different amounts of fluorine, but a quantity equal to about 1.5 to 2 per cent of the total arsenate (measured as $As_2O_5$) is preferred, as this imparts effective resistance for practical use of an insecticide on plants. In calcium arsenate insecticides of the sort now made commercially, containing from 40 to 50 per cent $As_2O_5$, more or less, such quantity of fluorine is about 0.75 per cent of the whole. In certain instances, larger amounts of fluorine may be used, although in general a quantity equal to 3 or 4 per cent of the total $As_2O_5$ is enough (meaning a fluorine content of not more than 1 or 1.5 per cent of the complete commercial product), and in some cases, a larger quantity may amount to a disadvantageous diluent of the active $As_2O_5$ content of the insecticide.

As stated, various ways have been found to make the stabilized arsenate. An effective method of making an improved insecticide, for example, is to treat a calcium arsenate product of that type with a fluorine compound in such manner that the combined fluorine is physically and permanently incorporated in the arsenate, and/or that preferably a chemical reaction takes place with the production of an insoluble fluoride, such as calcium fluoride. This result can be accomplished by treating the previously prepared insecticide with a solution of a fluorine compound, in amount sufficient to give the desired fluorine content. The treatment can conveniently consist in digesting the calcium arsenate with the fluoride solution, as by stirring the solution more or less slowly with the mass of calcium arsenate particles, preferably at a somewhat elevated temperature. The product resulting from this treatment with a soluble fluoride, when washed, and if desired dried, contains combined fluorine, which is not readily or at all dissolved out by water, and which is intimately associated with the arsenate in the manner hereinabove described. At the same time the desired resistance to $CO_2$ and ability to withstand deterioration in increase of soluble arsenic are imparted to a high degree. Among the fluorine compounds that may be used in preparing such insecticide or the like from previously produced calcium arsenate, for example of the sort described, are sodium fluoride, potassium fluoride, ammonium fluoride, sodium silico-fluoride, hydrofluoric or hydrofluosilicic acids, or like soluble fluorine compounds.

The following is a specific example of this process: Freshly precipitated calcium arsenate, prepared by mixing 100 parts by weight of arsenic acid (75% $As_2O_5$ by weight) and milk of lime comprising 75 parts by weight of CaO which had been slaked to a thin paste, was suspended in 2000 parts by weight of water, in which 8 parts by weight of sodium fluoride had been dissolved. With the temperature of the water at about 80° C., the mixture was digested with stirring for about half an hour. The resulting precipitate was then filtered out, washed and dried. In this case, the product analyzed, in percentages by weight:

| | |
|---|---|
| Total $As_2O_5$ | 40.80 |
| Water soluble $As_2O_5$ | 0.76 |
| Fluorine | 1.38 |

After exposure for at least 90 hours to an atmosphere consisting of moist $CO_2$, analysis showed the water soluble $As_2O_5$ in the product to be 0.38% by weight,—representing an actual decrease of soluble arsenic under extremely severe conditions, rather than the very substantial increase which would ordinarily be expected in such case. It will be understood, of course, that the amount of water soluble arsenic originally present in the arsenate can be regulated, and for example reduced, as by increasing the amount of lime used in manufacture, to any desired quantity; and the inclusion of combined fluorine, as described, will then prevent substantial or harmful increase of that desired quantity.

In general, the product is a powder which for insecticidal use can be dusted on the plants to be protected; in some cases, where desired, the improved arsenate can be made up in a paste or like form for use, with any necessary dilution, as a spray. It will also be understood that other suitable plant-protective agents or the like may be included in the manufactured product, to any commercially desired extent.

Another method of preparing the improved arsenate resides in introducing the fluorine component in the course of making the calcium arsenate. For example, there may be added to arsenic acid a small amount of calcium fluoride, and after warming and agitating the mixture in a substantial quantity of water, milk of lime is added and stirred in, preferably at a slow rate. As will be appreciated, the lime and arsenic acid react to provide the desired calcium arsenate, and the final precipitated product, which may be washed and dried for use as an insecticidal dusting powder, includes calcium fluoride in the described intimate association with the arsenate, there apparently being at least a mutual adsorption of the ingredients of the sort stated hereinabove. Other fluorine compounds, such as sodium fluoride, potassium fluoride, etc., may be employed in this method, in lieu of the calcium fluoride, and excellent stabilization of the arsenate insecticide obtained.

It is to be understood that the invention is not limited to the embodiments and procedure herein specifically described, but may be carried out in other ways without departing from its spirit as defined by the following claims:

I claim:

1. A product of the class described, containing calcium arsenate, and combined fluorine insolubly and intimately associated with the arsenate for stabilizing the latter against deterioration by liberation of soluble arsenic under the action of carbon dioxide, the amount of fluorine being equal to not more than about 4% of the total $As_2O_5$ content.

2. A product of the class described, containing calcium arsenate, and a free fluorine compound insolubly and intimately associated with said arsenate for stabilizing the latter against deterioration by liberation of soluble arsenic under the action of carbon dioxide.

3. A product of the class described, containing calcium arsenate, and combined fluorine insolubly associated with the arsenate not less intimately than with an association characteristic of a mutual adsorption of arsenate and combined fluorine, the amount of fluorine being equal to not more than about 4% of the total $As_2O_5$ content.

4. A product of the class described, containing calcium arsenate, and a free fluorine compound insolubly associated in intimate association therewith characteristic of a mutual adsorption of arsenate and the fluorine compound.

5. A product of the class described, containing calcium arsenate including a small quantity of soluble arsenic and having insolubly associated therewith combined fluorine for stabilizing the arsenate to resist increase of soluble arsenic content under the action of carbon dioxide.

6. A product of the class described, containing arsenate material selected from the class consisting of tri-calcium arsenate, basic calcium arsenates, and calcium arsenates having an excess of lime, and containing combined fluorine in insoluble association with the arsenate for resisting deteriorating influences tending to liberate soluble arsenic therein, said association being not less close than an association characteristic of a mutual adsorption of arsenate and combined fluorine, and the amount of fluorine being equal to not more than about 4% of the total $As_2O_5$ content.

7. A product of the class described, containing calcium arsenate, and a small amount of a free fluorine compound insolubly and intimately associated with the arsenate for stabilizing the latter to resist deteriorating influences tending to liberate soluble arsenic therein.

8. In a method of making calcium arsenate products of the class described, the step of insolubly associating combined fluorine with the arsenate by treating the prepared calcium arsenate with a soluble fluorine compound in water.

9. In a method of making calcium arsenate products of the class described, the step of insolubly incorporating into the prepared calcium arsenate a free fluorine compound in intimate association therewith characteristic of a mutual adsorption of arsenate and the fluorine compound, said step including digesting said arsenate with a soluble fluorine compound.

10. A method of making calcium arsenate products of the class described, comprising treating arsenic acid with lime and then preparing a precipitate containing combined fluorine in insoluble association with the arsenate by treating the resulting freshly prepared arsenate with a soluble fluorine compound in water.

11. A method of stabilizing calcium arsenate products of the class described against deteriorating influences tending to liberate soluble arsenic, comprising preparing a precipitate of arsenate and insoluble combined fluorine by digesting the prepared calcium arsenate in water with a soluble fluorine compound, to incorporate into the arsenate combined fluorine for stabilizing the same.

12. A method of stabilizing calcium arsenate products of the class described against deteriorating influences tending to liberate soluble arsenic, comprising insolubly associated combined fluorine with the arsenate by treating the prepared calcium arsenate with a solution of sodium fluoride at about 80° C.

SIMON KLOSKY.